United States Patent
Baseotto et al.

(10) Patent No.: US 7,143,463 B2
(45) Date of Patent: Dec. 5, 2006

(54) DEVICE FOR DETACHABLY AND HINGEDLY CONNECTING A WIPER BLADE FOR CLEANING PANES TO A WIPER ARM

(75) Inventors: Michel Baseotto, Hasselt (BE); Christian Wilms, Beringen (BE); Hubert Verelst, Tienen (BE); Frans Breesch, Borgloon (BE); Tom Vangeel, Heverlee (BE)

(73) Assignee: Robert Bosch GmbH (DE)

( * ) Notice: Subject to any disclaimer, the term of this patent is extended or adjusted under 35 U.S.C. 154(b) by 296 days.

(21) Appl. No.: 10/399,588

(22) PCT Filed: Oct. 26, 2001

(86) PCT No.: PCT/DE01/04019

§ 371 (c)(1),
(2), (4) Date: Apr. 18, 2003

(87) PCT Pub. No.: WO02/34592

PCT Pub. Date: May 2, 2002

(65) Prior Publication Data

US 2003/0182753 A1 Oct. 2, 2003

(30) Foreign Application Priority Data

Oct. 28, 2000 (DE) ................. 100 53 602

(51) Int. Cl.
*B60S 1/38* (2006.01)
*B60S 1/40* (2006.01)
(52) U.S. Cl. ................. 15/250.32; 15/250.43
(58) Field of Classification Search ............. 15/250.32, 15/250.43, 250.44, 250.351, 250.451, 250.452, 15/250.453, 250.454
See application file for complete search history.

(56) References Cited

U.S. PATENT DOCUMENTS 4,017,936 A * 4/1977 Schweikert .............. 15/250.32

(Continued)

FOREIGN PATENT DOCUMENTS

DE 44399 * 7/1956

(Continued)

*Primary Examiner*—Gary K. Graham
(74) *Attorney, Agent, or Firm*—Michael Best & Friedrich

(57) ABSTRACT

The invention relates to a device for the detachable, articulated connection of a wiper blade (14) for cleaning windows, in particular of motor vehicles, to a wiper arm (12) driven on one end, which is provided with a first coupling half (26) on its other, particularly, its free end (13) and a connecting device (24) featuring a second wiper-blade-mounted coupling half (28), which is arranged on the upper band side (23) of a band-like, long-stretched-out, elastic supporting element (22), on whose other, lower band surface, (21) a rubber-elastic wiper strip (20) that can be placed on the window (19) is situated, and the wiper-blade-mounted coupling half (28) has a pivot pin (46) aligned transverse to the wiper blade's longitudinal extension and transverse to the placement direction (arrow 18) to connect to the wiper arm (12), whose longitudinal axis forms the articulation axis (17) of the device and which is allocated to a pin rest receptacle (62) present on the wiper-arm-mounted coupling half (26). A particularly reliable and enduring connection between the wiper-blade-mounted coupling half (28) and the supporting element (22) of the wiper blade (14) is achieved if the wiper-blade-mounted second coupling half (28) is embodied as a sheet metal bent part, on which the pivot pin (46) is formed, connected as a single part.

17 Claims, 5 Drawing Sheets

Figure 1:
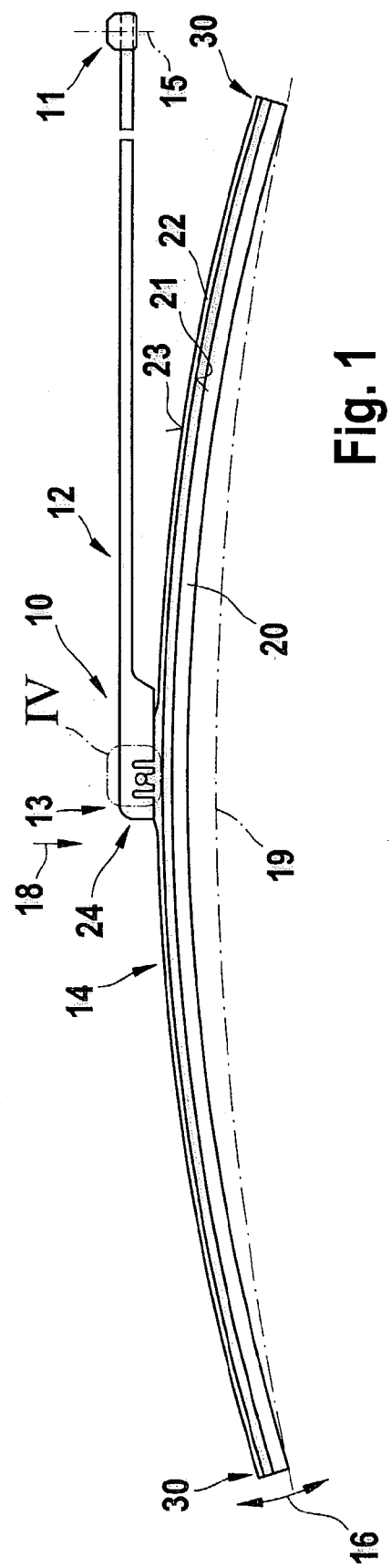

U.S. PATENT DOCUMENTS 4,177,537 A * 12/1979 Roadarmel ............... 15/250.32
4,318,200 A *  3/1982 Bauer et al. ............. 15/250.32
4,391,015 A *  7/1983 van den Berg .......... 15/250.46
6,055,697 A *  5/2000 Wollenschlaeger ....... 15/250.43

FOREIGN PATENT DOCUMENTS

DE    197 29 864    1/1999
DE    196 41 042    4/2000

* cited by examiner

DEVICE FOR DETACHABLY AND HINGEDLY CONNECTING A WIPER BLADE FOR CLEANING PANES TO A WIPER ARM

STATE OF THE ART

Wiper blades to clean the windows of motor vehicles are always connected in an articulated manner with the wiper arm performing the work movement so that the wiper blade can perform an oscillating motion vis-à-vis the wiper arm whose axis of oscillation lies transverse to the longitudinal extension of the wiper arm and transverse to the direction of a force acting upon the wiper blade to apply the wiper blade to the window. This articulated connection between the wiper blade and the wiper arm is of particular significance. Because the to-be-wiped, normally spherically curved window does not represent the section of a spherical surface, the wiper blade must be able to constantly adapt during wiper movement to the respective position and progression of the window surface. The articulated connection must therefore be smooth running but also free of play so that quiet, rattle-free wiper movement is possible.

In the case of wiper blades where a band-like, long-stretched-out, elastic supporting element, with a wiper strip attached to its lower side that can be placed adjacent to the windshield, is used in place of a conventional, multi-unit supporting-bracket design to distribute the bearing force coming from the wiper arm onto the wiper strip, the supporting element must be equipped with a component that is provided with the required articulation means on its upper band surface facing away from the wiper arm, serving as half of a connecting coupling on the wiper-blade side whose other half is connected with the wiper arm. In order to do justice to the already described requirements placed on the articulation, the axis of articulation must be aligned transverse to the wiper blade's longitudinal extension. In addition, the axis of articulation must also extend transverse to the direction of the bearing force, which holds the wiper blade adjacent to the window due to the action of the wiper arm. Normally, such an articulated connection includes a pivot pin, which is connected with the wiper blade or wiper arm. The pin rest receptacle assigned to the pivot pin is then located on the wiper arm or wiper blade.

In the case of a known device of the type designated in the pre-characterizing clause of the independent claim (DE 1972986.1A1), the wiper-blade-mounted coupling half is a plastic part that is connected to the supporting element with by the two aligned ends of a pivot pin projecting from this. For fastening purposes with the supporting element, this coupling half is provided with longitudinal grooves into which the outer longitudinal edges of the supporting element dip. In order to guarantee that the coupling half fits properly on the supporting element, the longitudinal edges of the supporting element should merely be roughened or provided with claw-like teeth. However, it has been shown that this type of fastening is not able to handle (in terms of providing complete satisfaction) the fatigue strain, such as occurs in the back-and-forth movement of wiper operation.

ADVANTAGES OF THE INVENTION

Due to the formation of the coupling half on the wiper-blade side as a sheet metal bent part, it is possible to connect it to the supporting element of the wiper blade by means of, for example, the proven spot welding process. This type of fastening reliably withstands fatigue stress. As a result of the pivot pin being formed directly on this coupling half, an intermediate assembly step—fastening a separate metal articulated bolt to a support on the coupling half—is eliminated.

To do so, it is advisable for at least one partial section of the sheet metal bent part to be rolled like a sleeve and reshaped as a pivot pin.

An embodiment of the coupling half on the wiper-blade side especially suited for manufacturing is produced if base strips, connected to the supporting element and aligned parallel to one another and at a distance from one another, belong to the sheet metal bent part, whose base strips are connected to one another other by a bow-like bridge featuring the pivot pin.

In an embodiment of the connecting device in accordance with the invention preferred for certain application cases, the pivot pin rolled like a sleeve features two partial pins that are aligned with each other, which project laterally beyond the bow-like bridge. Due to the development of the coupling half on the wiper-blade side, a low-slung wiper blade can be realized whose advantages are brought to bear particularly in the case of the high travel speeds of the motor vehicle.

If the supporting element is formed by two parallel spring rails arranged in the wiper strip's longitudinal grooves whose edges are open to the outside and if the progression of the window to be wiped features a continuously changing curvature, a relative movement between the wiper strip and the spring rails that is not influenced by the coupling half is required. This is guaranteed by the longitudinal axis of the pivot pin being located at a distance from the upper band side of the supporting element. As a result, enough space remains between the pivot pin and the wiper strip for the area of the wiper strip that limits the longitudinal grooves towards the top.

In order to provide the wiper blade with good lateral guidance during its work movement occurring transverse to its longitudinal extension, there is a leg extending away from the supporting element and aligned in the longitudinal direction of the supporting element situated on each base strip, whereby the legs lie at a distance from one another as seen transverse to the longitudinal extension of the wiper blade and these legs dip so they fit between cheeks provided on the wiper arm that are directed towards the wiper blade.

Special advantages are produced if the wiper-arm-mounted coupling half is preferably arranged on the free end of the wiper arm, and if, moreover, this coupling half has a U-shaped cross-section and the pin rest receptacles are embodied on the U-legs of this coupling half. In this connection, the wiper arm can by all means extend beyond the coupling half on the wiper-arm side with an extension. The U-shaped cross-section of this coupling half should then be situated by the end region of the wiper arm where the drive is active, because then, for example, the legs of the wiper blade base strips can cooperate with the insides of the U-legs of the wiper arm within the sense of the cheeks mentioned. At the same time, the pin rest receptacles can also be embodied on the U-legs of the wiper arm without additional measures.

If, in a development of the invention, claw-like extensions are located on the longitudinal edges of the base strips that face away from one another, which grip around the longitudinal edges of the supporting element that face away from one another in a clamping fashion, the safety of the connection between the supporting element and coupling half of the wiper-blade side is improved, because an additional clamping effect can be exerted on the supporting element via these claws. In addition, these claw-like extensions serve as guides when this coupling half is being positioned for assembly on the supporting element.

A development of the invention that is advantageous for certain application cases is achieved if the distance from the supporting element to the longitudinal axis of the pivot pin is at least twice as great as the diameter of the pivot pin, and if, moreover, the base strips are connected to the pivot pin via the supporting angles of the bow that are formed on these and if a passage remains between the opposing supporting angles of the base strip that are transverse to the wiper blade longitudinal extension, which is limited towards the top by the pivot pin. Along with other advantages, the passage that occurs between the supporting angles of the bow and the pivot pin connected with this on both ends facilitates the use of the wiper blade structure already explained, in which the supporting element has two spring rails arranged in the wiper strip's longitudinal grooves and the upper limitation of the longitudinal grooves is achieved by a cover area of the wiper strip which rises above the upper band side of the supporting element. This area also offers enough space for the wiper arm's pin rest receptacles.

In order to achieve a particularly compact design of the coupling half of the wiper-blade side is appropriate, if the supporting angles are arranged between two clamp-like extensions of the base strips.

An especially good lateral guidance of the wiper blade during wiper operation is produced if a leg extending away from the supporting element and aligned in the longitudinal direction of the supporting element is located on each base strip, if these legs lie at a distance from one another as seen transverse to the longitudinal extension of the wiper blade and if these legs dip so that they fit between the cheeks provided on the wiper arm that are directed towards the wiper blade.

A particularly advantageous continuation of the inventive idea provides that the wiper-arm-mounted coupling half is preferably arranged on the free end of the wiper arm, that this coupling half has a U-shaped cross-section and that the pin rest receptacle is embodied on a projecting part present on the U-base that extends between the two U-legs. This results in excellent protection of the articulation against environmental influences because the pivot pin and the pin rest receptacles of the wiper arm are accommodated in an encapsulated manner within an area that is enclosed by the two U-legs and the U-base of the wiper arm. Moreover, the two U-legs can simultaneously assume the function of the previously mentioned checks cooperating with the legs of the wiper blades.

A wiper blade with a band-like, long-stretched-out supporting element for a rubber-elastic wiper strip arranged on its lower band surface, on whose upper band surface, a coupling half on the wiper-blade side is attached in the center longitudinal section to connect the wiper blade in an articulated manner to the wiper arm provided with the other coupling half, whereby the coupling half on the wiper-blade side has two supports, attached transverse to the longitudinal extension of the wiper blade at a distance from one another for at least one pin-like articulated bolt held on these whose articulation axis is aligned transverse to the wiper blade longitudinal extension can be stably designed in a simple way and be permanently connected to the coupling half on the wiper-blade side, if this coupling half is embodied as a sheet metal bent part and the pivot pin is formed on this, connected to it as a single part.

According to the respective applications cases, it can be appropriate if the pivot pin is arranged either between the two supports or else the pivot pin features two partial pins that are aligned with each other, which are arranged on the outer sides of the supports facing away from one another and extending away from these.

Additional advantageous further developments and designs of the invention are disclosed in the following description of the exemplary embodiments depicted in the associated drawing.

DRAWING

Figure 2:
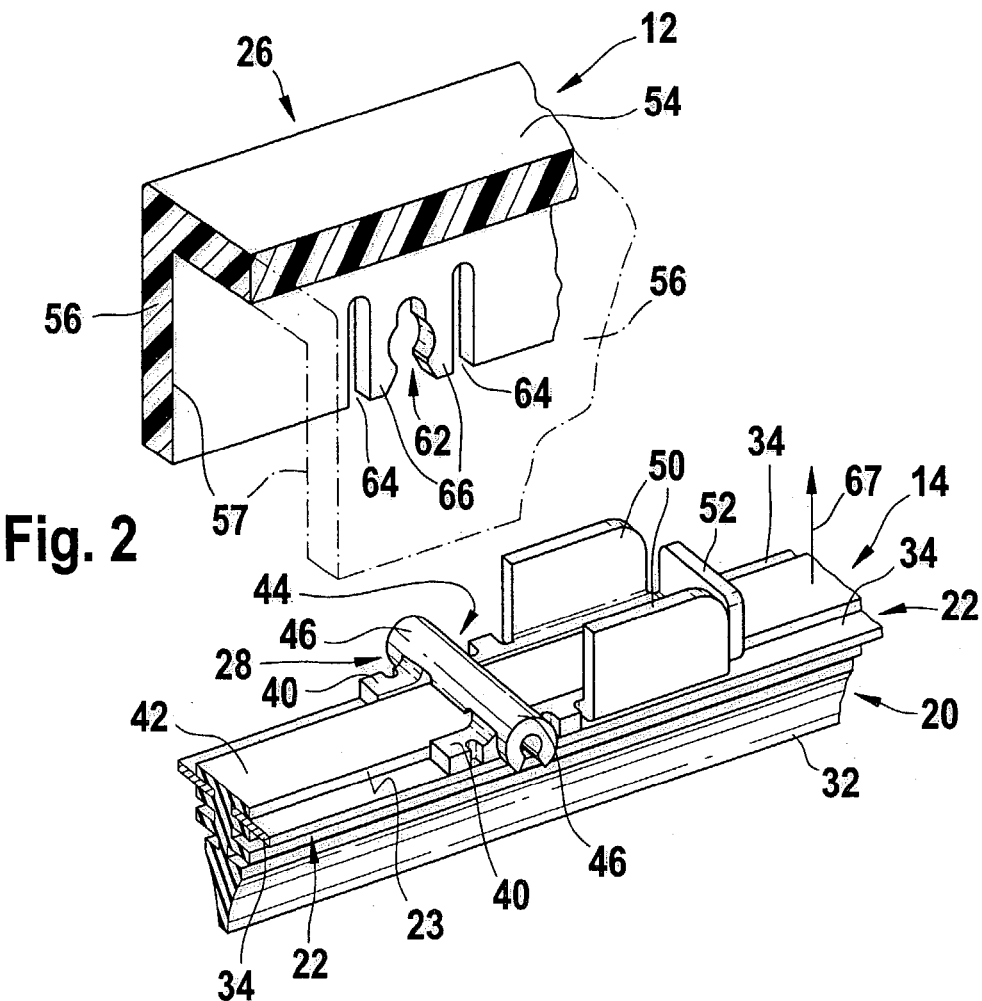
Figure 3:
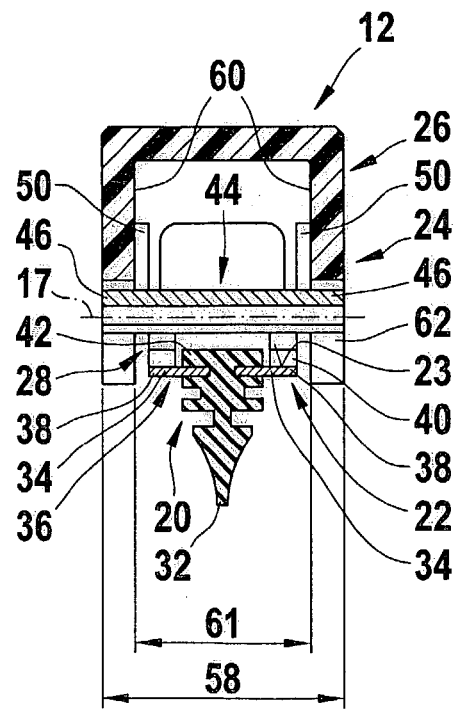
Figure 4:
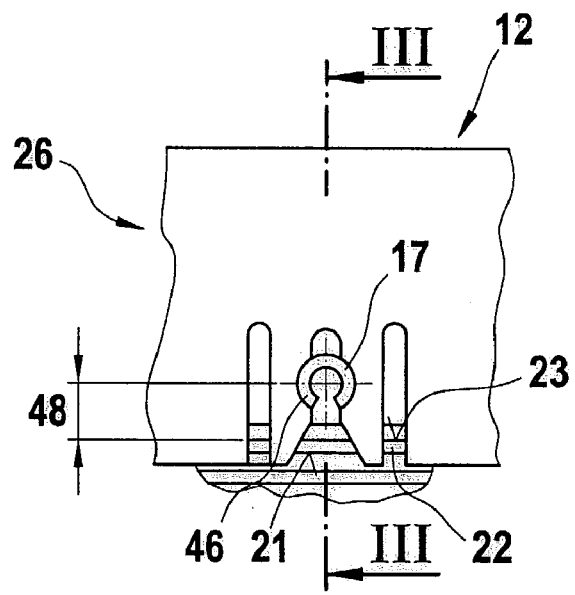
Figure 5:
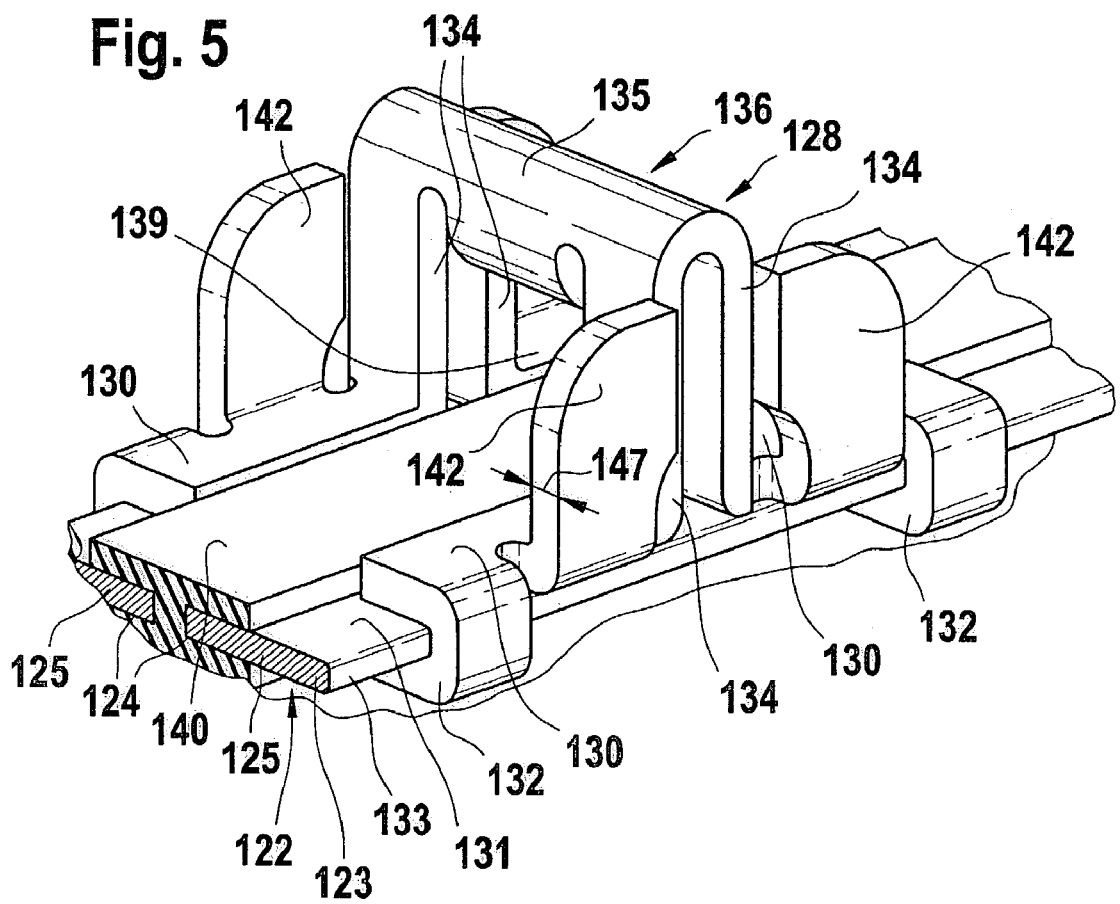
Figure 6:
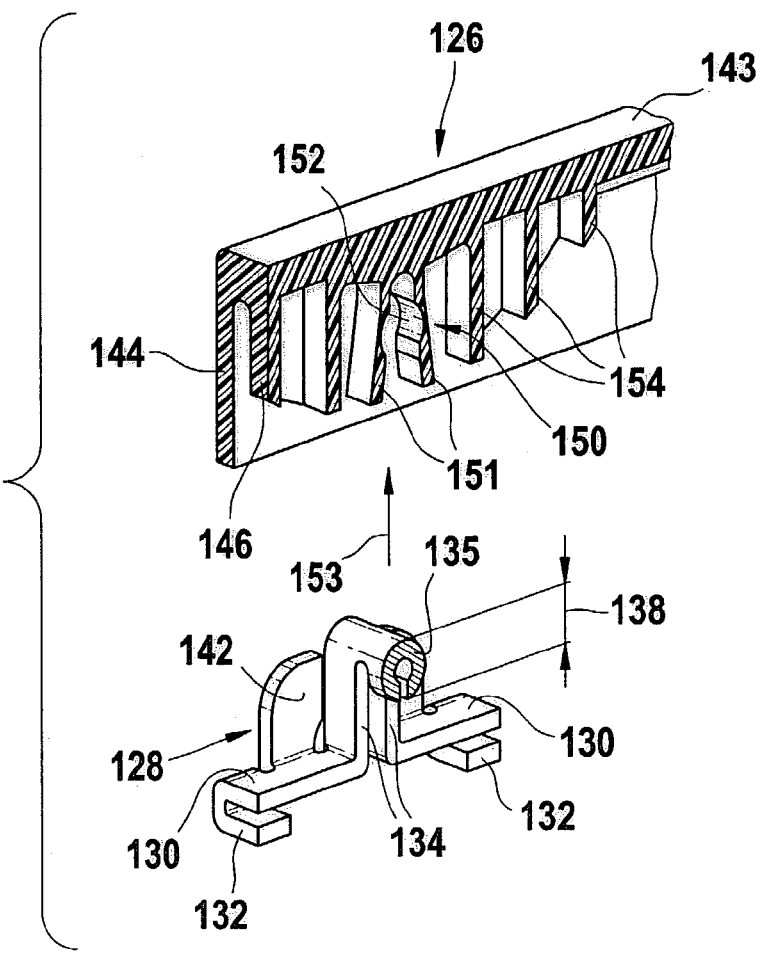
Figure 7:
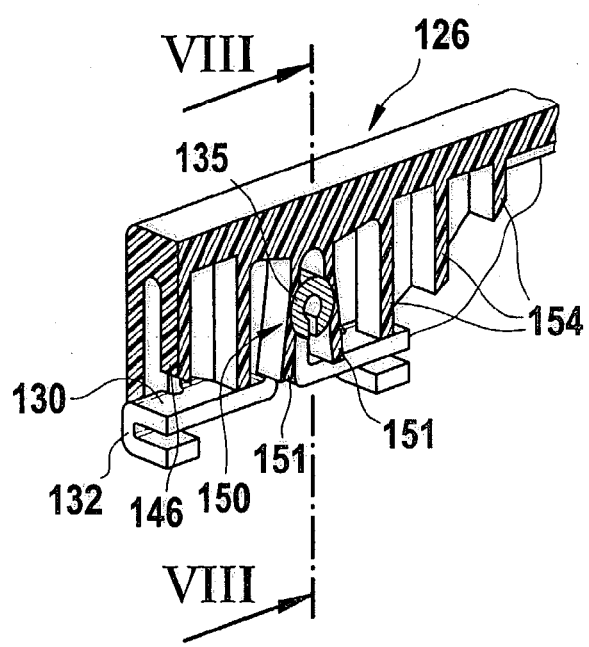

The drawings show:

FIG. 1—A side view of a wiper blade that is not true to scale, which is connected to a wiper arm in an articulated manner via a connecting device;

FIG. 2—A detail designated by IV in FIG. 1, depicted isometrically and enlarged in a longitudinal section, whereby the wiper blade is separated from the wiper arm;

FIG. 3—A cross-section through the arrangement according to FIG. 4 along line III—III;

FIG. 4—An enlarged representation of the detail designated by IV in FIG. 1;

FIG. 5—An isometric partial representation of a wiper blade with its coupling half developed in accordance with another embodiment of the invention in an enlarged representation;

FIG. 6—A separate isometric representation of the two coupling halves in accordance with the other embodiment of the invention;

FIG. 7—The two coupling halves according to FIG. 6 in an assembled state and

Figure 8:
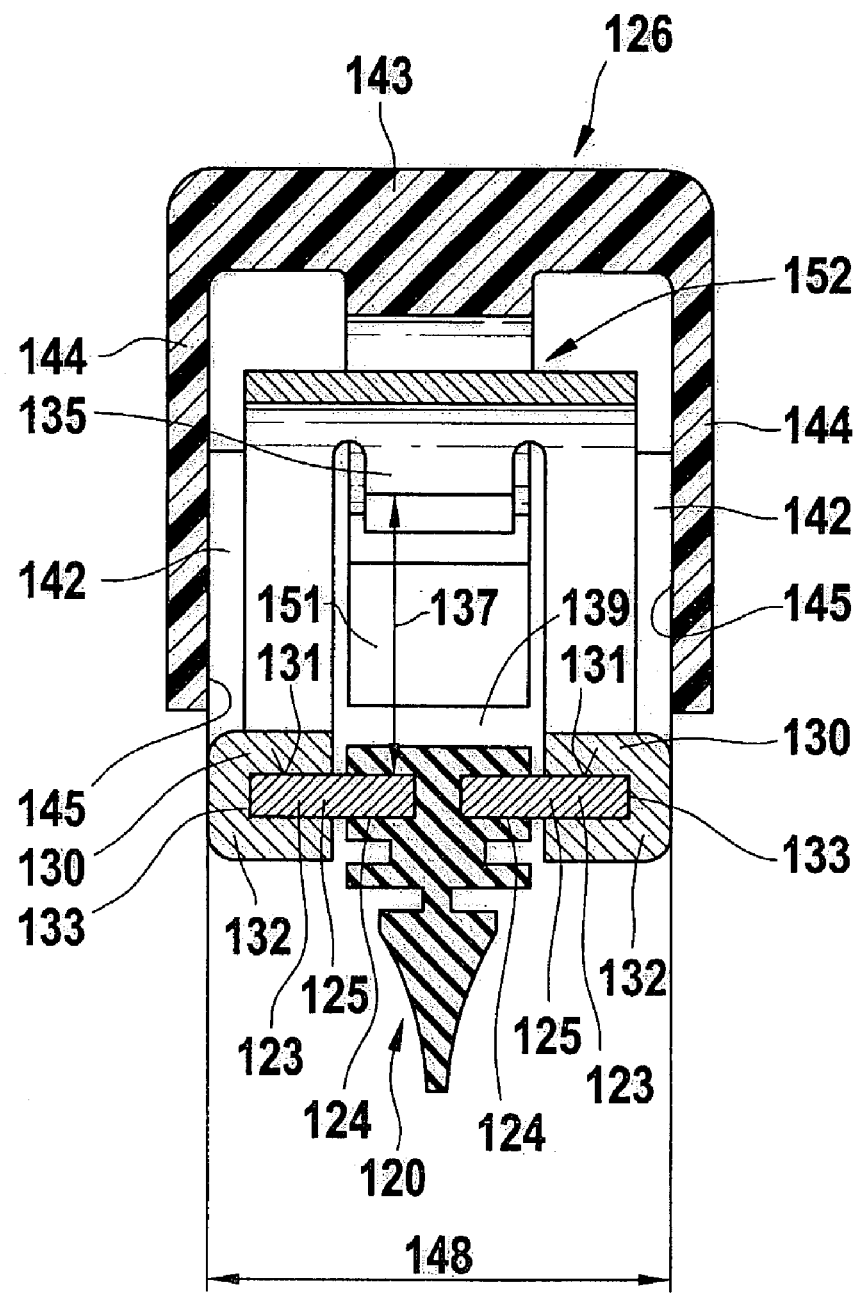

FIG. 8—A cross-section along line VIII—VIII through the arrangement according to FIG. 7 in an enlarged representation.

DESCRIPTION OF THE EXEMPLARY EMBODIMENTS

A wiper arm, 12, driven in an oscillating motion by its one end, 11, and a wiper blade, 14, that is detachably connected to it are part a wiper lever, 10, depicted in FIG. 1 in a lateral view. The wiper blade, 14, is connected to the other free end, 13, that faces away from the pendulum axis, 15, in such a way that it can perform an oscillating motion (double arrow 16) vis-à-vis the wiper arm, 12. The position and progression of the axis of oscillation can be seen in FIGS. 3 and 4 and have been labeled with reference number, 17. As can be seen in these figures, the axis of oscillation, 17, extends transverse to the longitudinal extension of the wiper arm, 12, as well as transverse to the direction of a force (designated by arrow 18 in FIG. 1), which is exerted by the wiper arm on the wiper blade, 14, and which applies this wiper blade to the to-be-wiped window, 19, with a long-stretched-out, rubber-elastic wiper strip, 20. The long-stretched-out, rubber-elastic wiper strip, 20, is arranged on the lower band surface, 21, of an elastic, band-like, long-stretched-out, single-part or multi-part supporting element, 22. On the other, upper band surface, 23, of the wiper blade, 14, that faces the wiper arm, 12, the wiper lever, 10, is provided with a connecting device, 24, that includes a first coupling half, 26, on the wiper-arm side and a second coupling half, 28, on the wiper-blade side (FIGS. 2 though 4). The surface designated by 19 in FIG. 1 belongs to a normally spherically curved windshield of a motor vehicle. As can be seen further in FIG. 1, the curved wiper blade, 14, that has not yet been placed against the window has a greater curvature than the window surface, 19. Since line 19 is supposed to represent the greatest curvature of the window surface it is clearly evident that the curvature of the still relaxed wiper blade, 14 that is adjacent to the window, 19, at its two ends, 30, is greater than the maximum curvature of the window. Under the application force that acts in the direction of the arrow 18, the wiper blade, 14, applies its wiper strip, 20, or its wiper lip, 32, formed on the wiper strip to the window surface, 19, over its entire length. In doing so, tension builds up in the elastic supporting element, 22, fabricated of metal and this tension is responsible for the proper application of the wiper strip over its entire length on the window, 19. Because the normally spherically curved window does not represent the section of a spherical surface, the wiper blade, 14, must be able to constantly adapt to the respective position and progression of the window surface, 19, vis-à-vis the wiper arm, 12, during the wiper operation that takes place transverse to its longitudinal extension. This is accomplished via the articulated connection between the wiper arm, 12, and the wiper, 14, and the already mentioned required oscillation motion (double arrow 16), with which the wiper blade, 14, can oscillate vis-à-vis the wiper arm, 12, around the axis of oscillation, 17.

The special design of a first embodiment of this articulated connection is supposed to be examined in detail in the following with the aid of FIGS. 2 though 4. As FIGS. 2 and 3 show, the elastic supporting element, 22, features two parallel spring rails, 34, that lie on a common plane. Their facing inner edges are situated in longitudinal grooves, 36, which are arranged in the upper region of the wiper lip, 20. The spring rails, 34, project with outer longitudinal strips, 38, out of the longitudinal grooves, 36, whereby the upper band surface, 23, of the supporting element, 22, is facing the wiper arm, 12. The coupling half, 28, on the wiper-blade side is fastened to, preferably welded on, this upper band surface, 23.

It is embodied as a sheet metal bent part and has two parallel base strips, 40, whose under side on the upper band surface, 23, of the supporting element are adjacent to the respective longitudinal strip, 38, and are connected to the supporting element, 22, for example by means of spot welding. The base strips, 40, extend in the longitudinal direction of the wiper blade. Located between the two base strips, 40, is therefore a so-called cover area, 42, of the wiper strip, 20, which represents the upper limitation of the longitudinal grooves, 36 (FIG. 3). Adjacent to their one end, the two base strips, 40, are connected together via a bow-like bridge, 44, that is designed with them to be a single part. The bridge, 44, thus runs transverse to the longitudinal extension of the wiper blade, 14, or transverse to the longitudinal extension of the supporting element, 22. Its two ends extend beyond the two base strips, 40. At least these two ends are rolled like a sleeve in such a way that partial pins, 46, aligned with each other are produced, which project laterally beyond the base strips, 40, and serve a pivot pins (FIGS. 2 and 3). They therefore form the extensions of the bridge, 44, by connecting the two base strips, by which the bridge is also reshaped in such a way that it produces a rigid connection between the two base strips, 40. At the same time that the bridge forms a support for the two partial pins, 46, forming the pivot pins on the base strips, 40. It is evident from FIGS. 2 through 4 that the longitudinal axis, 17, of the two pivot pins, 46, is located at a distance, 48, from the upper band surface, 23, of the supporting element, 22 (FIG. 4). A free, undisturbed passage of the wiper strip, 20, under the bridge, 44, is thereby guaranteed. In its further progression, a leg, 50, is bent on each of the two base strips, 40 of the coupling half, 28, on the wiper-blade side. The two legs extend parallel to each another in the longitudinal direction of the supporting element, 22, in planes that are aligned vertical to the supporting element. In addition, this coupling half, 28, is provided with a reinforcing wall, 52, on its end area that faces away from the bridge, 44, and this wall is aligned transverse to the longitudinal extension of the wiper blade and connects the two base strips, 40, to one another. It is preferred that, just like the two legs, 50, the reinforcing wall, 52, be connected with these as a single part, i.e., be formed on these. Naturally, enough space remains between the reinforcing wall, 52, and the spring rails, 34, for the cover area, 42, of the wiper strip, 20, so that this is guided through under the reinforcing wall, 52, free of contact. Thus, a sheet metal bent part is produced with two base strips, 40, that are connected to one another via a bridge, 44, and which serves as a coupling half on the wiper-blade side. Extensions on both sides of the bridge are rolled in such a way that two pivot pins, 46, are produced whose longitudinal axes align with one another. Moreover, the two legs, 50, formed as a single part on the base strips, 40, as well as the transverse-aligned reinforcing wall, 52, that is also connected to the base strips, 40, as a single part belong to the coupling half, 28.

In the exemplary embodiment the coupling half, 26, on the wiper-arm side is embodied on the free end, 13, of the wiper arm, 12. However, this does not preclude the wiper arm from being provided (for reasons related to styling, for example) with an extension that extends up to the end of the wiper blade, 14, facing away from the wiper arm. When one speaks here of the free end of the wiper arm, what is always meant is the section of the wiper arm that is connected to the wiper blade, 14, where the drive is active. As FIGS. 2 and 3 show, the coupling half, 26, on the wiper-arm side has a U-shaped cross-section. It has therefore a U-base, 54, onto which two parallel U-legs, 56, located at a distance from one another are attached. For reasons of clarity, the coupling half, 26 in FIG. 2, is depicted in a longitudinal section so that a portion of the U-base, 54, and one of the U-legs, 56, is depicted using dash-dotted lines. FIG. 3 shows that the ends of the partial pins or pivot pins, 46, facing away from one another are at a distance, 58, from one another that correspond to the distance between the two outside surfaces of the U-legs, 56. The facing inside walls, 60, of the U-legs, 56, are at a distance, 61, from one another that is coordinated with the distance between the outside surfaces of the legs, 50 (facing away from one another) of the coupling half, 28, on the wiper-blade side in such a way that they can dip so they fit practically without play in the manner depicted in FIG. 3 between the U-legs, 56, or between the facing cheeks, 57, of these U-legs of the coupling half, 26, on the wiper-arm side. This produces excellent guidance of the wiper blade on the wiper arm when the wiper blade is moved transverse to its longitudinal extension over the to-be-wiped window, 19, during its wiping function. The coupling half, 26, on the wiper-arm side is manufactured from an elastic plastic. Open-edge recesses, 62, are arranged as pin rest receptacles for the pivot pins, 46, in the two U-legs, 56, towards the free ends of the U-legs, 56. On both sides of each recess, 62, the U-legs, 56, are each also provided with open-edge slits, 64, so that finger-like strips, 66, remaining between the slits and the recess can expand against a restoring force far enough that the pivot pins, 46, can be inserted into their bearing positions formed on the facing sides of the strips, 66, when the wiper blade is attached to the wiper arm, 12, in the direction of the arrow, 67. This then produces an assembly, which is depicted in FIGS. 3 and 4. The separation of the wiper blade, 14, from the wiper arm, 12, takes place in a manner opposite from the assembly movement, whereby, via a corresponding load of the wiper blade, 14, against the arrow, 67, the two strips, 66, are again elastically deflected or expanded against the restoring force so that the pivot pins, 46, can emerge from the recesses, 62, or from their pin rest receptacles.

Another embodiment of the connecting device in accordance with the invention is explained on the basis of FIGS. 5 through 8. Also in this case as FIG. 5 shows, the coupling half, 128, on the wiper-blade side is embodied as a sheet metal bent part. This also has two parallel base strips, 130, arranged at a distance from one another, which extend in the longitudinal extension of the wiper blade or supporting element, 122. Also in this case, the supporting element, 122, includes two spring rails, 125, aligned parallel to each other on a common plane, which together form the supporting element, 122. The facing inner longitudinal sections of the spring rails, 125, lie in the open-edge longitudinal grooves, 124, of the wiper strip, 120, and project out of the longitudinal grooves, 124, with outer longitudinal strips, 123. The base strips, 130, are adjacent to the upper band surface, 131, of the spring rails, 125, or the supporting element, 122. Claw-like extensions, 132, are located on the longitudinal edges of the base strips that face away from one another, which grip around the outer longitudinal edges, 133, of the supporting element, 122, that face away from one another in a clamping fashion. Along with the fastening (embodied as spot welding) of the base strips, 130, to the spring rails, 125, of the supporting element, 122, the claw-like extensions, 132, improve the connection between the coupling half, 128, on the wiper-blade side and the supporting element, 122, if these claws are correspondingly clamped together. In addition, FIGS. 5, 6 and 8 show that the base strips, 130, are connected via a supporting angle, 134, formed on this to a pivot pin, 135, which is embodied on a bow-like bridge, 136, connecting the supporting angles, 134, of the base strips, 130. In this connection, the supporting angles, 134, are each arranged between the claw-like extensions, 132, of a base strip, 130.

The distance, 137, between the pivot pin, 135, and the supporting element, 122, is at least twice as great as the diameter, 138, (FIG. 6) of the pivot pin, 135. As a result, a passage, 139, remains between the opposing supporting angles, 134, of the base strip, 130, that are transverse to the wiper-blade longitudinal extension, on the one hand, and the supporting element, 122, and the pivot pin, 135, on the other. This passage, 139, is large enough to permit passage that is free of contact for the cover area, 140, which limits the longitudinal grooves, 124, of the wiper strip, 120, at the top. A leg, 142, extending away from the supporting element and aligned in the longitudinal direction of the supporting element, 122, is located on each of the base strips, 130; the leg features two leg halves and each leg half is located on one of the two sides of the supporting angle, 134. The two partial legs of each base strip, 130, form an associated wall whose significance will be dealt with later.

The structure of the coupling half, 126, on the wiper-arm side can be seen in FIGS. 6 through 8. This coupling half also has an essentially U-shaped cross-section (FIG. 8). It therefore has a U-base, 143, onto which attach two U-legs, 144, located at a distance from one another. The facing inside walls of the cheeks, 145, of the U-legs, 144, are at a distance, 146, from one another that corresponds to the distance between the two outside walls of the legs, 142, that face away from one another. Parallel intermediate walls, 146, (FIGS. 6 and 7) are formed on the U-base, 143, to the U-legs, 144, at a distance from these inner walls, 145, whereby the distance between the inner walls, 146, and the U-legs, 144, is coordinated with the thickness, 147 (FIG. 5), of the legs, 142. In addition, a clamp support, 150, is formed on the U-base, 143, of the coupling half, 126, which includes two elastic deflectable lobes, 151. A pin rest receptacle, 152, for the pivot pin, 135, is embodied in the facing inner sides of the lobes, 151. Just like the strips, 66, in the case of the already described embodiment, the lobes, 151, formed as a single part on the coupling half, 126, fabricated of an elastic plastic are free in such a way that they can expand far enough for the pivot pin, 135, to reach its pin rest receptacle, 152. In this connection, the lobes are embodied on the open side in such a way that alone an assembly motion designated by arrow, 153, in FIG. 6 effects the expansion of the lobes, 151, against a restoring force.

In the case of the operating position depicted in FIGS. 7 and 8, the elevated legs, 142, of the base strips, 130, extend into the slit-like interspaces between the intermediate walls, 146, and the U-legs, 144, of the coupling half, 126, whereby they fit adjacent to the cheeks formed by the U-legs, 144, of the wiper arm and/or by the intermediate walls, 146, facing them. This provides for proper guidance of the wiper blade, 14, vis-à-vis the wiper arm, 12. Reinforcing rips, 154, between the intermediate walls contribute to stabilizing the coupling half, 126. To remove the wiper blade from the wiper arm or separate the two coupling halves, 126 and 128, from each other it is sufficient to load the wiper blade against the assembly arrow, 153, so that, with temporary expansion of the lobes, 151, the pivot pin, 135, emerges from its pin rest receptacle, 152.

Common to both embodiments of the invention described is that the wiper-blade-mounted second coupling half, 28 or 128, is embodied as a sheet metal bent part with on which the pivot pin, 46 or 135, is formed, connected as a single part.

A use of the invention is therefore already given if either the wiper blade and/or the wiper arm is embodied according to the disclosure claimed and provided here with respect to the articulation.

The invention claimed is:

1. A device for detachably and articulately connecting a windshield wiper blade to a wiper arm having a driven end and a free end, the wiper blade having a longitudinal axis, having a band-like, elongated, elastic supporting element with upper and lower surfaces, and having a wiper strip on the lower surface of the support element, the device having an articulation axis and comprising a first coupling half adapted to be mounted on the free end of the wiper arm, and the device also comprising a second coupling half adapted to be mounted on the upper surface of the supporting element, the second coupling half having a pivot pin adapted to be aligned transverse to the longitudinal axis of the wiper blade for connection to the first coupling half, the pivot pin having a longitudinal axis that forms the articulation axis of the device, and the pivot pin being received in a pin receptacle on the first coupling half, the second coupling half including a unitary, bent sheet metal part, on which the pivot pin is formed, characterized in that the sheet metal part includes base strips adapted to be connected to the supporting element of the wiper blade, the base strips being aligned parallel to one another and at a distance from one another, and the base strips being connected to one another by a bow-like bridge that includes the pivot pin, wherein the pivot pin includes two partial pins that are aligned with each other and that project laterally beyond the bow-like bridge; and wherein at least one partial section of the sheet metal part is rolled like a sleeve and reshaped as the pivot pin.

2. A device according to claim 1, wherein the first coupling half has a U-shaped cross-section with spaced U-legs, and the pin receptacle is formed in the U-legs.

3. A device according to claim 1, wherein the longitudinal axis of the pivot pin is adapted to be located at a distance from the upper surface of the supporting element.

4. A device for detachably and articulately connecting a windshield wiper blade to a wiper arm having a driven end and a free end, the wiper blade having a longitudinal axis, having a band-like, elongated, elastic supporting element with upper and lower surfaces, and having a wiper strip on the lower surface of the support element, the device having an articulation axis and comprising a first coupling half adapted to be mounted on the free end of the wiper arm, and the device also comprising a second coupling half adapted to be mounted on the upper surface of the supporting element, the second coupling half having a pivot pin adapted to be aligned transverse to the longitudinal axis of the wiper blade for connection to the first coupling half, the pivot pin having a longitudinal axis that forms the articulation axis of the device, and the pivot pin being received in a pin receptacle on the first coupling half, the second coupling half including a unitary, bent sheet metal part, on which the pivot pin is formed, characterized in that the sheet metal part includes base strips adapted to be connected to the supporting element of the wiper blade, the base strips being aligned parallel to one another and at a distance from one another, and the base strips being connected to one another by a bow-like bridge that includes the pivot pin, and wherein the base strips have longitudinal edges, and claw-like extensions are located on the longitudinal edges of the base strips that face away from one another, the claw-like extensions being adapted to grip around longitudinal edges of the supporting element in a clamping fashion, wherein the second coupling half includes a leg located on each base strip and extending away from the supporting element and aligned in the longitudinal direction of the supporting element, wherein the legs lie at a distance from one another as seen in a direction transverse to the longitudinal extension of the wiper blade, and wherein the legs fit between legs provided on the wiper arm that are directed toward the wiper blade.

5. A device according to claim 4, characterized in that at least one partial section of the sheet metal part is rolled like a sleeve and reshaped as the pivot pin.

6. A device according to claim 4, wherein the first coupling half has a U-shaped cross-section with spaced U-legs, and the pin receptacle is formed in the U-legs.

7. A device according to claim 4, wherein the longitudinal axis of the pivot pin is adapted to be located at a distance from the upper surface of the supporting element.

8. A device according to claim 7, wherein the second coupling half is configured so that the distance from the supporting element to the longitudinal axis of the pivot pin is at least twice as great as the diameter of the pivot pin, and the base strips are connected to the pivot pin via supporting angles of the bow-like bridge that are formed on the base strips, and a passage remains between the supporting angles, the passage being limited by the pivot pin.

9. A device according to claim 8, characterized in that the supporting angles are arranged between two clamp-like extensions of the base strips.

10. A device according to claim 4, characterized in that the first coupling half has a U-shaped cross-section with spaced U-legs and a U-base that extends between the U-legs, the U-base having a projection, and the pin receptacle is formed on the projection.

11. A device according to claim 4, characterized in that the pivot pin includes two partial pins that are aligned with each other and that project laterally beyond the bow-like bridge, and wherein the first coupling half includes spaced legs adapted to extend toward the wiper blade.

12. A device for detachably and articulately connecting a windshield wiper blade to a wiper arm having a driven end and a free end, the wiper blade having a longitudinal axis, having a band-like, elongated, elastic supporting element with upper and lower surfaces, and having a wiper strip on the lower surface of the support element, the device having an articulation axis and comprising a first coupling half adapted to be mounted on the free end of the wiper arm, and the device also comprising a second coupling half adapted to be mounted on the upper surface of the supporting element, the second coupling half having a pivot pin adapted to be aligned transverse to the longitudinal axis of the wiper blade for connection to the first coupling half, the pivot pin having a longitudinal axis that forms the articulation axis of the device, and the pivot pin being received in a pin receptacle on the first coupling half, the second coupling half including a unitary, bent sheet metal part, on which the pivot pin is formed, wherein the first coupling half includes spaced legs adapted to extend toward the wiper blade, wherein the sheet metal part includes base strips adapted to be connected to the supporting element of the wiper blade, the base strips being aligned parallel to one another and at a distance from one another, and the base strips having attached thereto respective legs adapted to extend away from the supporting element and aligned in the longitudinal direction of the wiper blade, the legs on the base strips being spaced in the direction transverse to the longitudinal axis of the wiper blade, and the legs on the base strips positioned so as to fit between the legs on the first coupling half.

13. A device according to claim 12, characterized in that at least one partial section of the sheet metal part is rolled like a sleeve and reshaped as the pivot pin.

14. A device according to claim 12, wherein the first coupling half has a U-shaped cross-section with spaced U-legs, and the pin receptacle is formed in the U-legs.

15. A device according to claim 12, wherein the longitudinal axis of the pivot pin is adapted to be located at a distance from the upper surface of the supporting element.

16. A device according to claim 15, wherein the base strips are connected to one another by a bow-like bridge that includes the pivot pin, and wherein the second coupling half is configured so that the distance from the supporting element to the longitudinal axis of the pivot pin is at least twice as great as the diameter of the pivot pin, and the base strips are connected to the pivot pin via supporting angles of the bow-like bridge that are formed on the base strips, and a passage remains between the supporting angles, the passage being limited by the pivot pin.

17. A device according to claim 16, characterized in that the supporting angles are arranged between two clamp-like extensions of the base strips.

* * * * *